United States Patent [19]
Miyamoto

[11] Patent Number: 5,276,687
[45] Date of Patent: Jan. 4, 1994

[54] NETWORK SYSTEM HAVING DIFFERENT ATTRIBUTES OF TERMINAL EQUIPMENT DEVICES

[75] Inventor: Naoyuki Miyamoto, Tama, Japan

[73] Assignee: Fujitsu Limited, Kawasaki, Japan

[21] Appl. No.: 895,461

[22] Filed: Jun. 8, 1992

Related U.S. Application Data

[63] Continuation of Ser. No. 508,555, Apr. 13, 1990, abandoned.

[30] Foreign Application Priority Data

Apr. 14, 1989 [JP] Japan .................................. 1-95821

[51] Int. Cl.$^5$ ........................ H01J 3/12; H04M 11/06
[52] U.S. Cl. ............................... 370/110.1; 370/94.1; 379/94; 379/100
[58] Field of Search ............................ 370/58.1-58.3, 60, 60.1, 85.1, 85.6, 94.1, 110.1; 379/93, 94, 96, 100, 243, 258; 340/825.5, 825.51; 358/400, 425, 442

[56] References Cited

U.S. PATENT DOCUMENTS

| | | | |
|---|---|---|---|
| 4,672,662 | 6/1987 | Nishino et al. ..................... | 370/58.1 |
| 4,746,986 | 5/1988 | Tanigawa .......................... | 379/100 |
| 4,870,678 | 9/1989 | Adachi ............................... | 379/100 |
| 4,878,216 | 10/1989 | Yunoki ............................. | 370/110.1 |
| 4,888,766 | 12/1989 | Ogasawara ....................... | 370/110.1 |
| 4,930,123 | 5/1990 | Shimizu ........................... | 370/110.1 |
| 4,961,185 | 10/1990 | Sawada ............................. | 379/100 |
| 4,995,073 | 2/1991 | Okata et al. ..................... | 379/100 |
| 4,998,248 | 3/1991 | Matsuzaki ....................... | 370/110.1 |
| 4,999,836 | 3/1991 | Fujiwara ......................... | 370/110.1 |
| 5,023,868 | 6/1991 | Davidson et al. ................. | 370/110.1 |

FOREIGN PATENT DOCUMENTS 0313313 4/1989 European Pat. Off. ......... 370/110.1

Primary Examiner—Douglas W. Olms
Assistant Examiner—Alpus H. Hsu
Attorney, Agent, or Firm—Staas & Halsey

[57] ABSTRACT

A network system includes a plurality of terminals classified into a plurality of groups, a network for selectively connecting the plurality of terminals to each other, and a control part for receiving a call indicating one of the groups from a source terminal which is one of the plurality of terminals and for coupling, through the network, the source terminal to a destination terminal which is one terminal included in one of the groups which has an attribute identical to that of the source terminal.

32 Claims, 11 Drawing Sheets

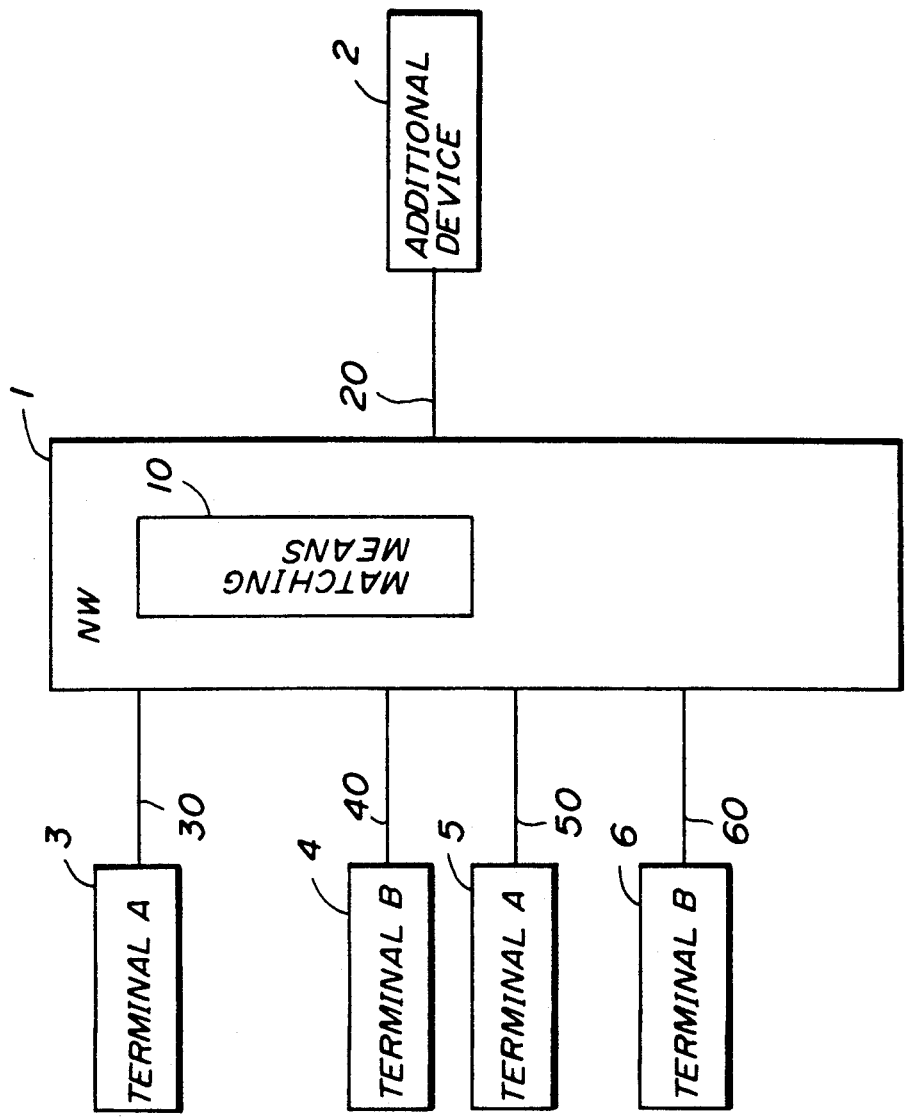

FIG. 5

| PILOT ADDRESS, NAME OF PILOT TERMINAL & ATTRIBUTE | NAME AND ADDRESS OF TERMINAL IN THE SAME GROUP AS PILOT TERMINAL | | ATTRIBUTE OF EACH TERMINAL |
|---|---|---|---|
| ADDRESS 701 DIGITAL TELEPHONE 0001 | COMPUTER 702 | | 0002 |
| | G4 FAX 703 | | 0003 |
| ADDRESS 801 DIGITAL TELEPHONE 0001 | COMPUTER 802 | | 0002 |
| | G4 FAX 703 | | 0003 |
| ---- | ---- | | ---- |

WRITE CONTENTS

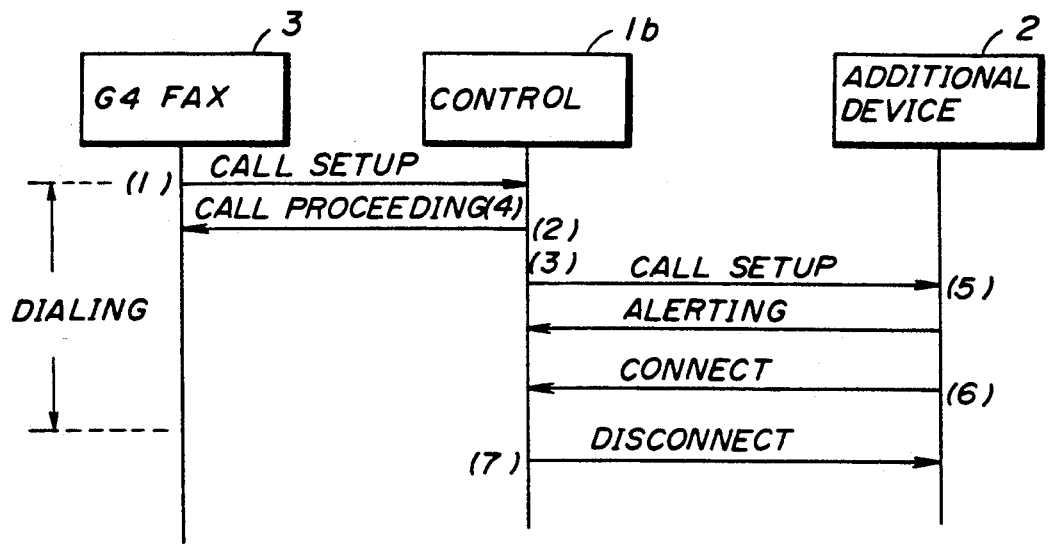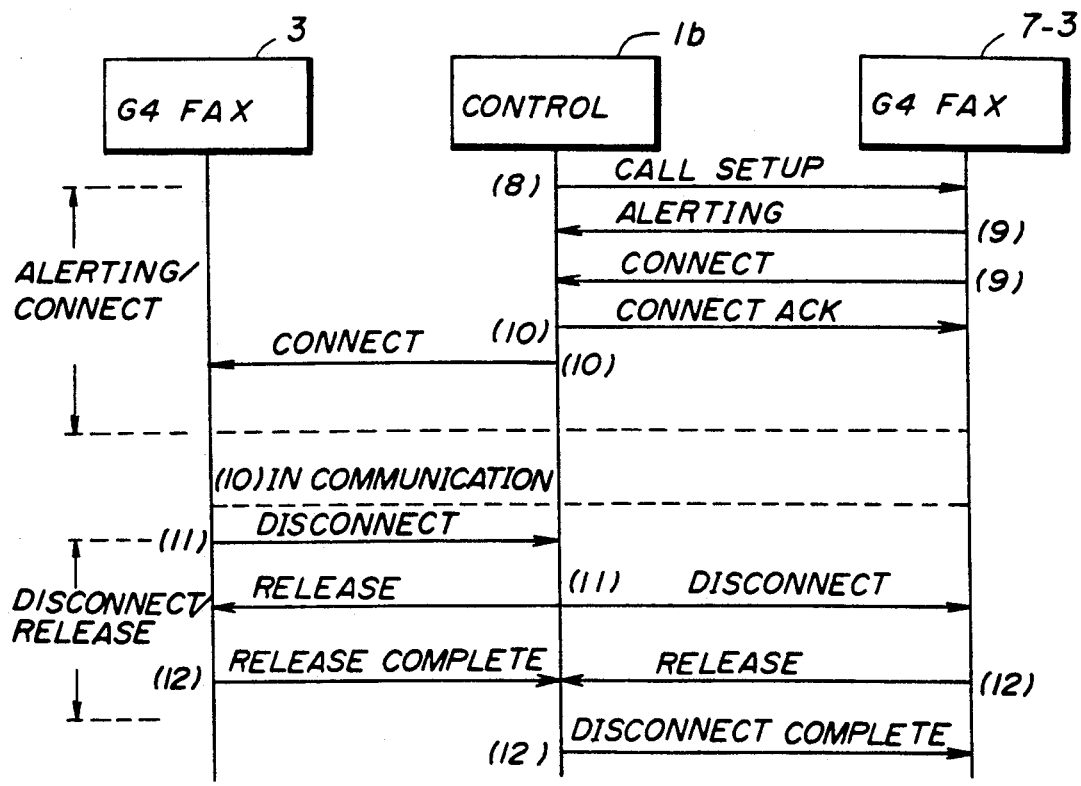

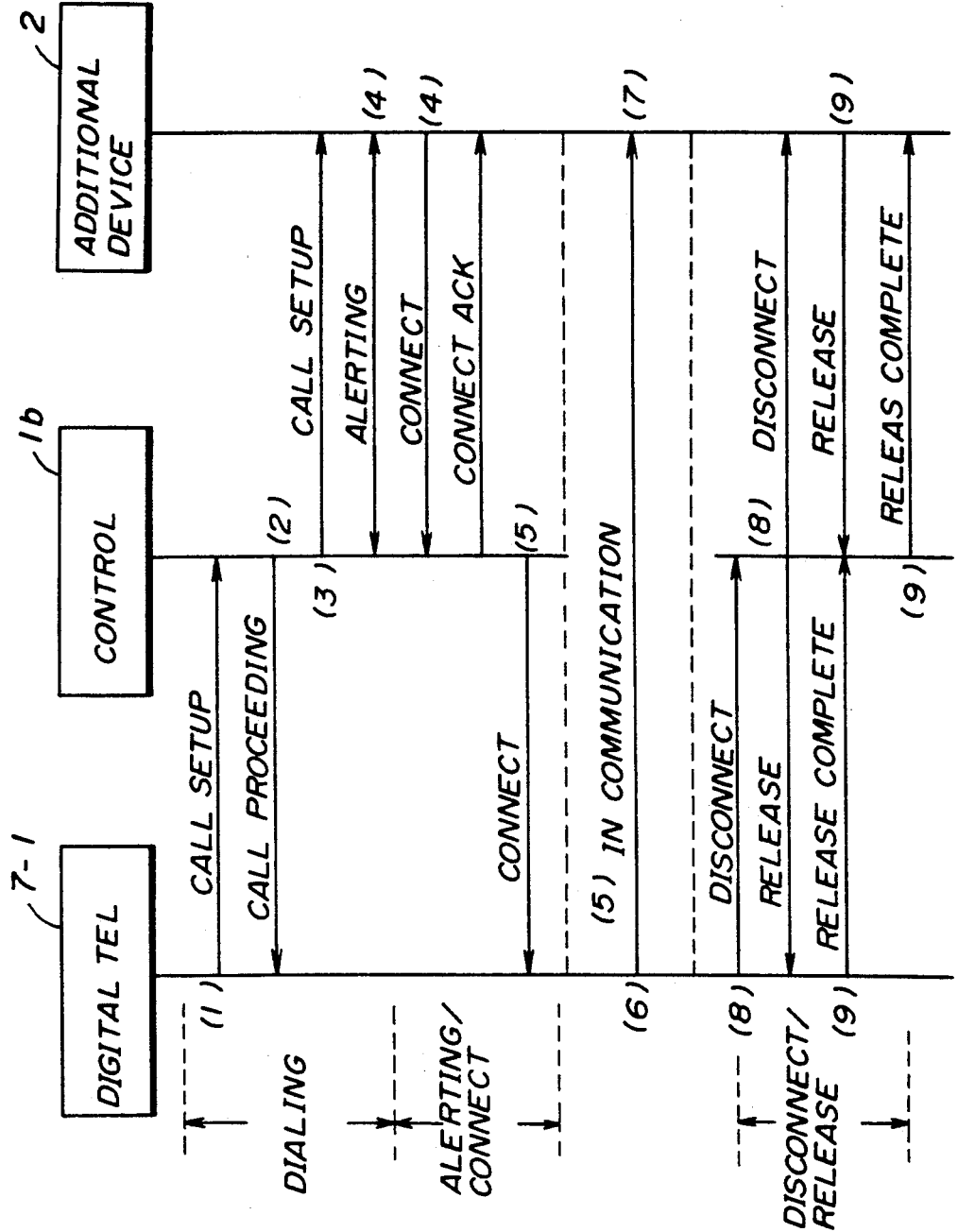

FIG.11

| LINE ADDRESS (PILOT TERMINAL) | ADDRESS OF EACH TERMINAL IN THE SAME GROUP AS PILOT TERMINAL | ATTRIBUTE OF EACH TERMINAL |
|---|---|---|
| 701 (TEL 1) | 702 | TEL 2 |
| | 703 | FAX |
| 801 (TEL 1) | 802 | TEL 2 |
| | 803 | TEL 3 |
| | 703 | FAX |
| | ---- | ---- |

NETWORK SYSTEM HAVING DIFFERENT ATTRIBUTES OF TERMINAL EQUIPMENT DEVICES

This application is a continuation of application No. 07/508,555, filed Apr. 13, 1990, now abandoned.

BACKGROUND OF THE INVENTION

1. Field of the Invention

The present invention generally relates to a network system having different attributes of terminal equipment devices, such as telephone sets, personal computers, G3 (group 3) facsimile machines and G4 (group 4) facsimile machines. More particularly, the present invention is directed to improvements in a network system having extension lines to which different attributes of terminal equipment devices are coupled.

2. Description of Related Art

Currently, there is a trend in which different attributes of terminal equipment devices other than telephone sets, such as personal computers, G3 facsimile machines and G4 facsimile machines are coupled to extension lines of a network system such as a network control unit (NCU), network terminating equipment or a digital service unit in an ISDN (Integrated Services Digital Network) system. In such a system, an identification number (address) such as a telephone number is provided for each terminal equipment device. For example, when an operator inputs an identification number, only a corresponding terminal equipment device is called. In other words, it is impossible for the calling operator to call a different terminal equipment device or a plurality of terminal equipment devices by the above identification number. This is inconvenient to users. Thus, there is a demand to eliminate the above-mentioned inconvenience be eliminated.

A network system has been proposed in which an identification number such as a telephone number identifies a group of terminal equipment devices and one of the grouped terminal equipment devices having the same attribute as the calling terminal equipment device is called.

Referring to FIG. 1, there is illustrated a conventional network system in conformity with an ISDN user/network interface recommended by the CCITT. A plurality of extension lines 30, 70 and 80 are coupled to a network 100 such as a line terminating equipment. The frequency range on each of the extension lines 30, 70 and 80 is divided into two information channels (B channels) and a signal channel (a D channel). Each B channel transfers communication data such as voice data or facsimile data. The D channel transfers either call control information such as dial information which may be necessary for each terminal equipment device to be coupled to the network 100 or answer information which is sent to each terminal equipment device.

In FIG. 1, a G4 facsimile machine 3 is connected to the extension line 30. A digital telephone set 7-1, a personal computer 7-2 and a G4 facsimile machine 7-3 are connected to the extension line 70. A digital telephone set 8-1, a personal computer 8-2 and a G4 facsimile machine 8-3 are connected to the extension line 80. An identification number or telephone number is determined for each of the extension lines 30, 70 and 80.

It is now assumed that a telephone number representative of the extension line 70 (pilot, agent or representative telephone number) is sent to the network 100 through the G4 facsimile line 3 which is currently a calling terminal equipment device. The network 100 changes the extension line 70 from an idle state to a called state in which call setup information and attribute information about the G4 facsimile machine 3 are sent to the extension line 70. Assuming that the attribute information about the G4 facsimile machine 3 is "0003", each of the terminal equipment devices 7-1, 7-2 and 7-3 connected to the extension line receive the call setup information and the attribute information, and determines whether its own attribute coincides with the attribute of the G4 facsimile machine 3. When a terminal equipment device determines that its own attribute coincides with the attribute of the G4 facsimile machine 3, the terminal equipment device having the same attribute responds to the call setup.

The conventional network system shown in FIG. 1 is disadvantaged by the fact that it is not possible to call each terminal equipment device by a plurality of pilot (representative) telephone numbers. For example, the G4 facsimile machine 8-3 can be called by only a pilot telephone number indicative of the extension line 80 and thus cannot be called by another pilot telephone number such as a pilot telephone number indicating the extension line 70. Also, when the G4 facsimile machines 7-3 and 8-3 are used in common by two sections of a company which are separately assigned the extension lines 70 and 80, it is desired that the G4 facsimile machine 7-3 can be called by not only a telephone number indicative of the extension line 70 but also a telephone number indicative of the extension line 80.

SUMMARY OF THE INVENTION

It is a general object of the present invention to provide a network system to which different attributes of terminal equipment devices are coupled, and in which the aforementioned disadvantages are eliminated.

A more specific object of the present invention is to provide a network system in which a terminal equipment device can be called by a plurality of pilot (representative) telephone numbers (addresses).

The above-mentioned objects of the present invention are achieved by a network system comprising a plurality of terminals classified into a plurality of groups; network means for selectively connecting the plurality of terminals to each other; and control means, operatively coupled to the network means, for receiving a call indicating one of the groups from a source terminal which is one of the plurality of terminals and for coupling, through the network means, the source terminal to a destination terminal which is a terminal included in the one of the groups and which has an attribute identical to that of the source terminal.

The aforementioned objects of the present invention are also achieved by a network system comprising a plurality of terminals classified into a plurality of groups; network means for selectively connecting the plurality of terminals to each other; and control means, operatively coupled to the network means, for receiving a call indicating one of the groups from a source terminal which is one of the plurality of terminals and for coupling, through the network means, the source terminal to all destination terminals, each of which is a terminal included in the one of the groups and which has an attribute identical to that of the source terminal.

The aforementioned objects of the present invention are also achieved by a network system comprising a plurality of terminals classified into a plurality of groups; network means for connecting the plurality of terminals to each other and connecting the plurality of terminals to lines from an external network; and first determining means, operatively coupled to the network means, for determining, when an incoming call having a telephone number designating one of the plurality of groups is supplied to the network means, whether or not an attribute of the incoming call coincides with an attribute of each terminal included in the one of the plurality of groups. The network system also comprises second determining means, operatively coupled to the network means and the first determining means. The second determining means determines whether there is any terminal which is included in the plurality of groups other than the one of the plurality of groups which has an attribute identical to that of the incoming call when the first determining means determines that there is no terminal in the one of the plurality of groups. The second determining means also terminates the incoming call at the terminal which is included in the plurality of groups other than the one of the plurality of groups and has an attribute identical to that of the incoming call when the first determining means determines that there is no terminal in the one of the plurality of groups.

Further objects, features and advantages of the present invention will become apparent from the following detailed description when read in conjunction with the accompanying drawings.

BRIEF DESCRIPTION OF THE DRAWINGS

FIG. 5 is a diagram illustrating a data table formed in a main memory provided in the device shown in FIG. 4;

FIG. 6 is a diagram illustrating a dialing procedure;

FIG. 8 is a diagram illustrating an alerting/connect procedure and a disconnect/release procedure;

FIG. 9 is a diagram illustrating an operation when data is written into the main memory shown in FIG. 4;

FIG. 11 is a diagram illustrating the data table used in the second embodiment of the present invention shown in FIG. 10.

DESCRIPTION OF THE PREFERRED EMBODIMENTS

Figure 2:
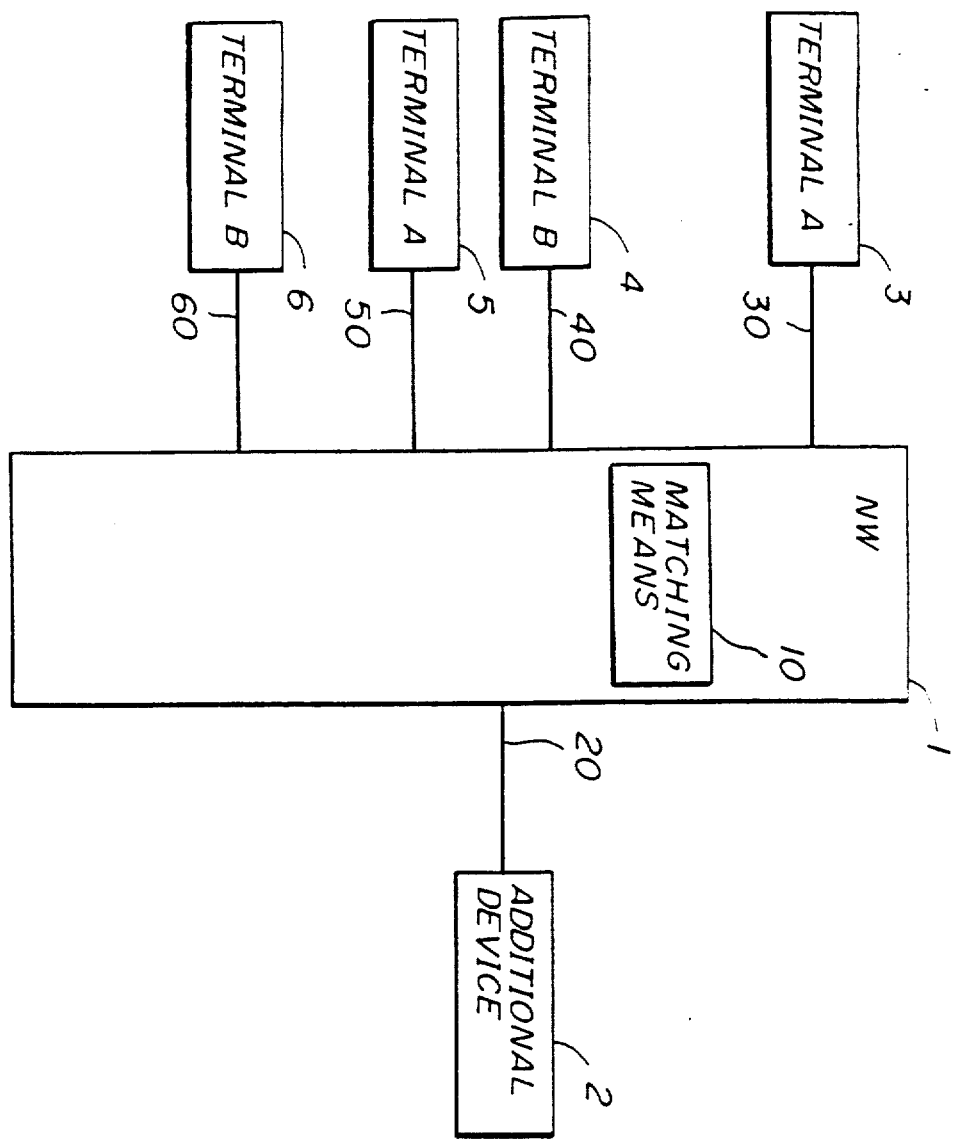
FIG. 2 is a block diagram of an outline of a first preferred embodiment of the present invention.
Figure 3:
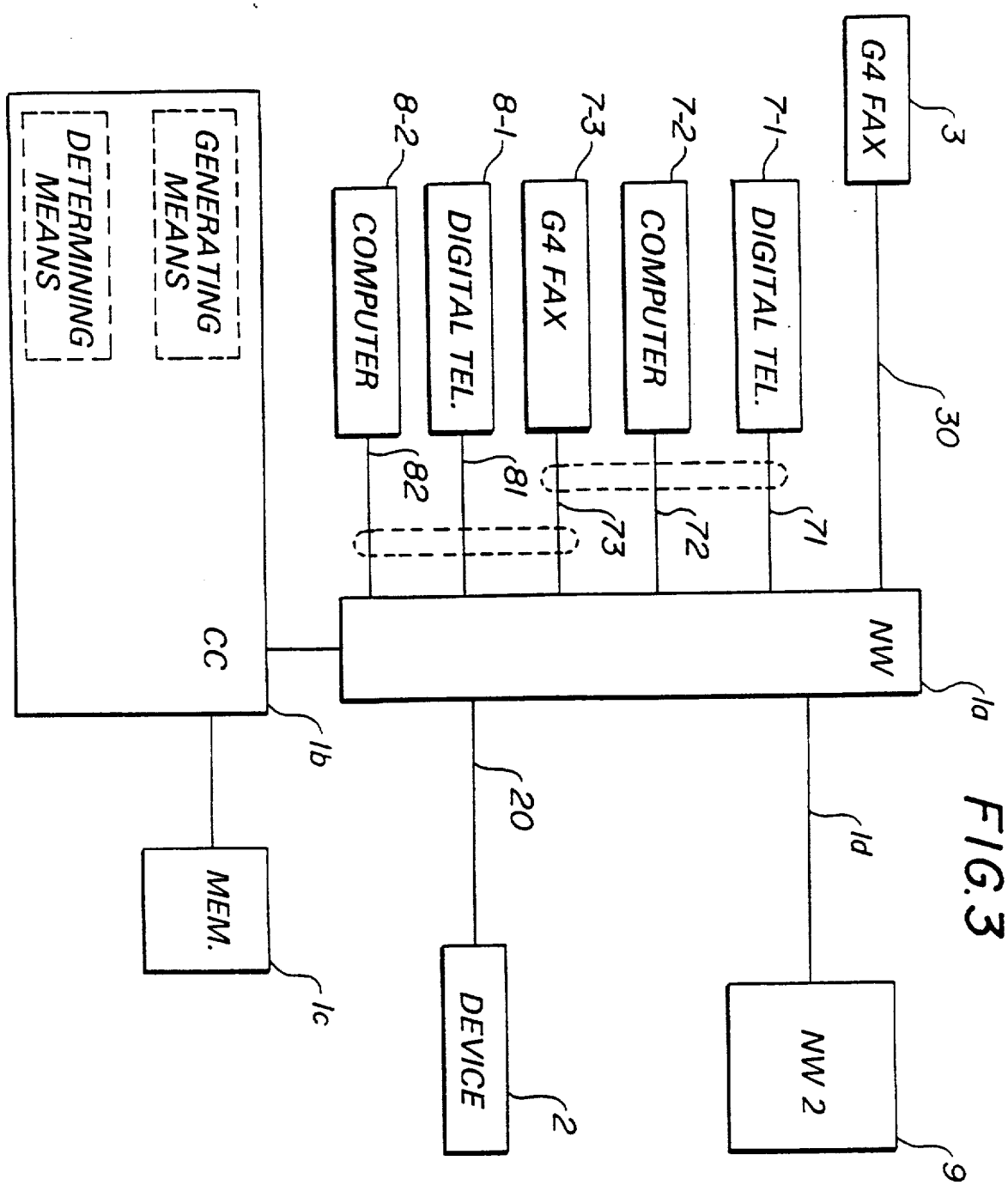
Figure 4:
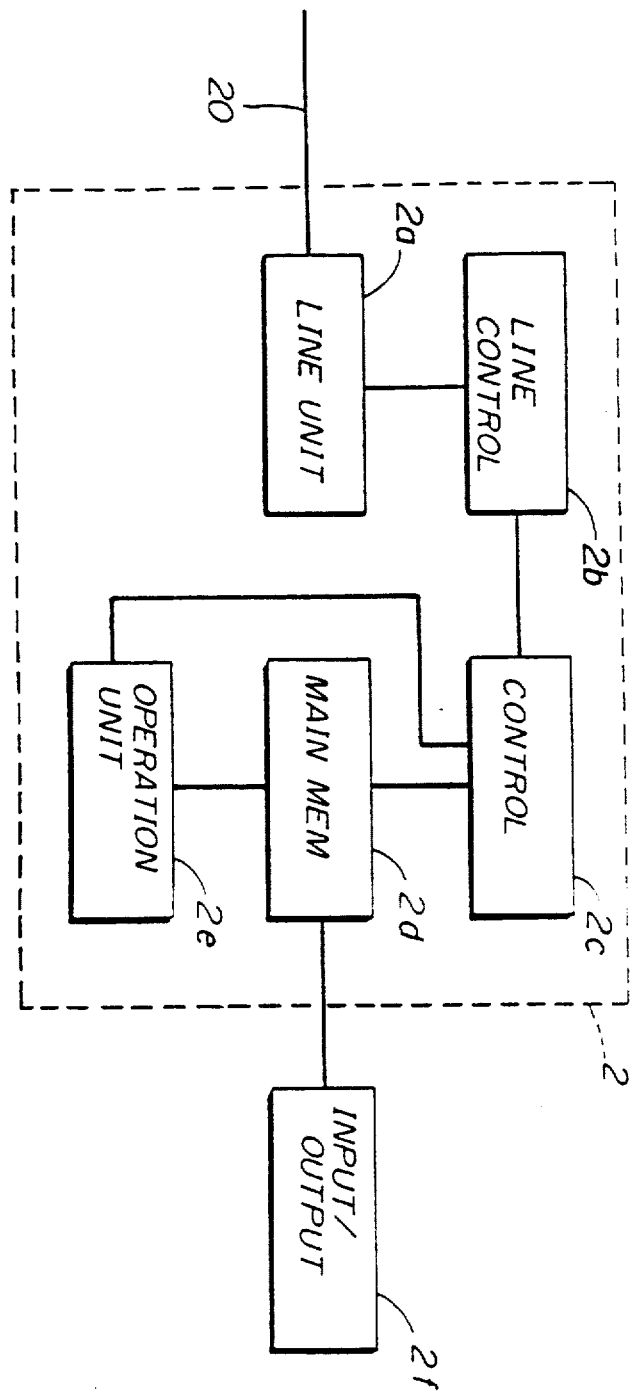
Figure 7A:
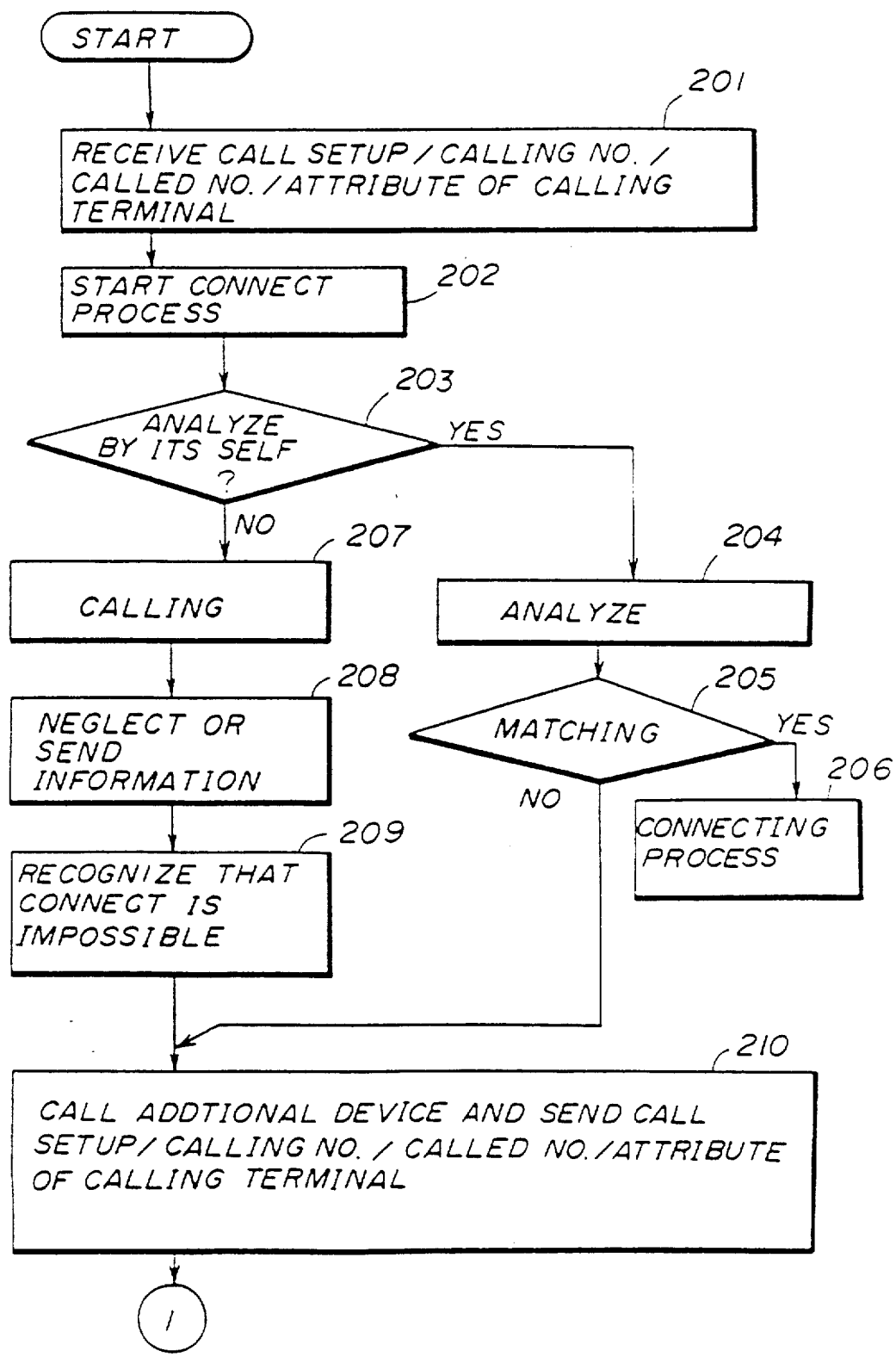
Figure 7B:
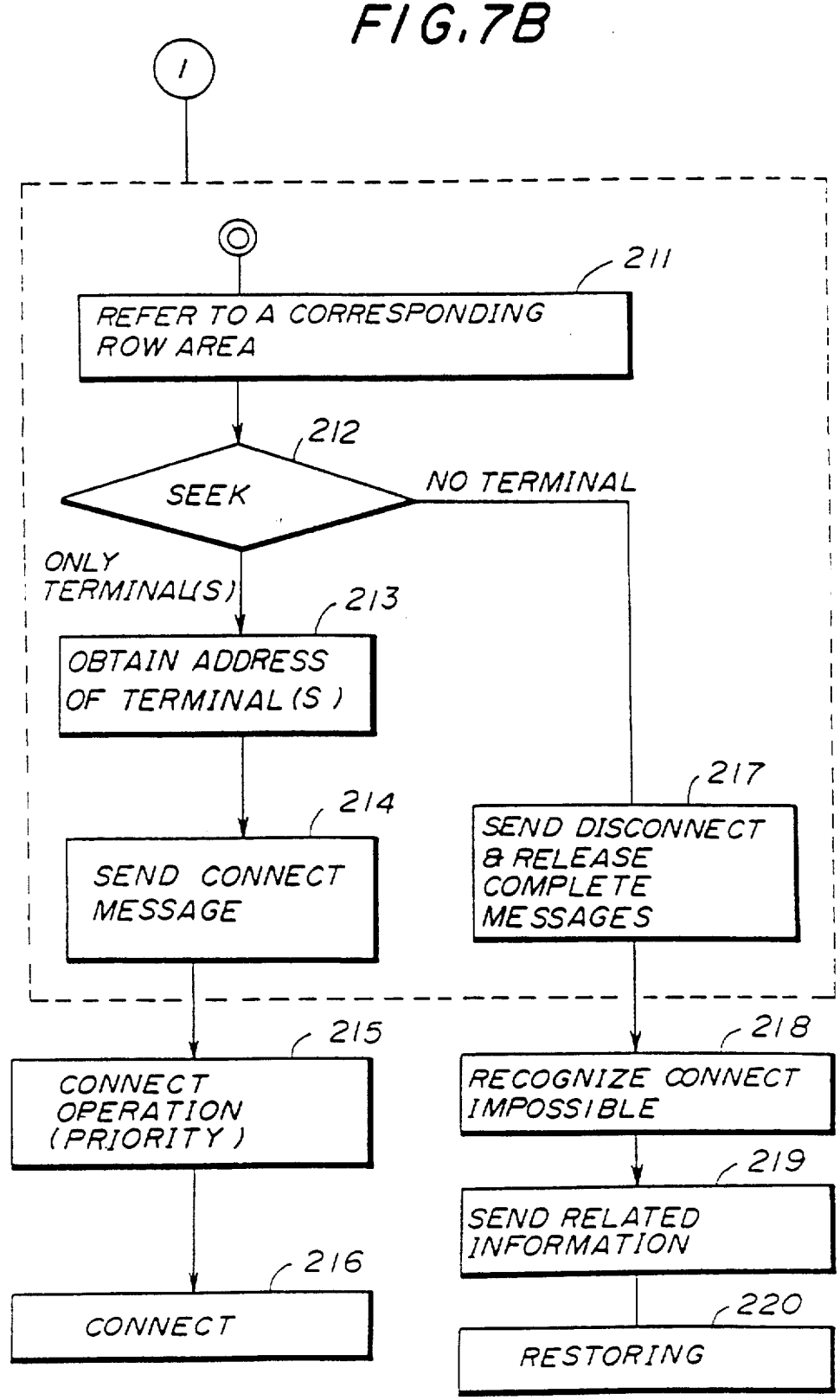

A description will now be given of a general network system according to a first preferred embodiment of the present invention with reference to FIG. 2. Terminal equipment devices 3, 4, 5 and 6 are respectively connected to extension lines (ISDN terminal lines) 30, 40, 50 and 60 extending from a network 1a, respectively. Hereinafter, each terminal equipment device is simply referred to as a terminal.

The terminals 3 and 5 have an identical attribute (hereafter referred to as attribute A), and the terminals 4 and 6 have an identical attribute (hereafter referred to as attribute B). The terminals 3-6 are divided into groups. For example, a first group consists of the terminals 4 and 5, and a second group consists of the terminals 5 and 6. A pilot identification number (pilot address) is assigned to each of the groups. It is noted that the terminal 5 belongs to not only the first group but also the second group. Thus, the terminal 5 can be identified by the pilot identification number related to the first group or the different pilot identification number related to the second group.

A device 2 is coupled to the network 1a through an extension line 20. The device 2 includes a data table which has a row area provided for each of the pilot identification numbers. The row area associated with the attribute A stores identification numbers of the terminal equipment devices 4 and 5 as well as the attribute information thereon. The identification number of the terminal equipment device 4, for example, serves as the pilot identification number of the group including the terminal equipment device 4. The row area associated with the attribute B stores identification numbers of the terminal equipment devices 5 and 6 as well as the attribute information thereon. The identification number of the terminal equipment device 5, for example, serves as the pilot identification number of the group including the terminal equipment device 5. The network 1a includes a terminal attribute matching means 10.

It is now assumed that the terminal 3 having the attribute A sends the pilot identification number which is addressed to the second group consisting of the terminals 5 and 6. At this time, the attribute information A of the calling terminal 3 is also sent to the network 1a. The terminal attribute matching means 10 in the network 1a refers to the row area related to the pilot identification number from the terminal 3, and compares the attribute information about the terminal 3 with the attribute information in each of the terminals defined in the accessed row area. The terminal attribute matching means 10 determines that the terminal 5 connected to the extension line 50 has the same attribute as the calling terminal 3. Then the terminal attribute matching means 10 connects the terminal 3 to the terminal 5. Alternatively, when the terminal 3 sends the pilot identification number related to the first group consisting of the terminals 4 and 5, the terminal attribute matching means 10 refers to the device 2 and determines that the terminal 5 has the same attribute as the calling terminal 3. Then, the terminal attribute matching means 10 controls the network 1a to connect the terminal 3 to the terminal 5. It should be appreciated that the terminal 5 can be addressed by not only the pilot identification number related to the first group but also the different pilot identification number related to the second group. The network 1a may conform to a line exchange network or a network based on the ISDN user/network interface.

A description will be given of a detailed structure of the first embodiment of the present invention with reference to FIG. 3. Referring to this figure, there is illustrated a network system in conformity to the ISDN user/network interface defined by the CCITT recommendation. A network (NW) 1a accommodates extension lines 20, 30, 71, 72, 73, 81 and 82. One terminal is coupled to each extension line. The G4 facsimile machine 3 is connected to the extension line 30. A digital telephone set 7-1, a personal computer 7-2 and a G4 facsimile machine 7-3 are connected to the extension lines 71, 72 and 73, respectively. A digital telephone set 8-1 and a personal computer 8-2 are connected to the extension lines 81 and 82, respectively. The extension lines are grouped into a first group consisting of the extension lines 71, 72 and 73, and a second group consisting of the extension lines 73, 81 and 82.

The network 1a is controlled by a network controller (CC) 1b to which a system memory (MEM) 1c is connected. The network controller 1b may be a central processing unit (CPU), for example. The system memory 1c stores data used for controlling the network 1a. The device 2 is connected to the network 1a through the extension line 20. The network 1a accommodates an external transmission line 1d coupled to another network NW9.

Figure 1:
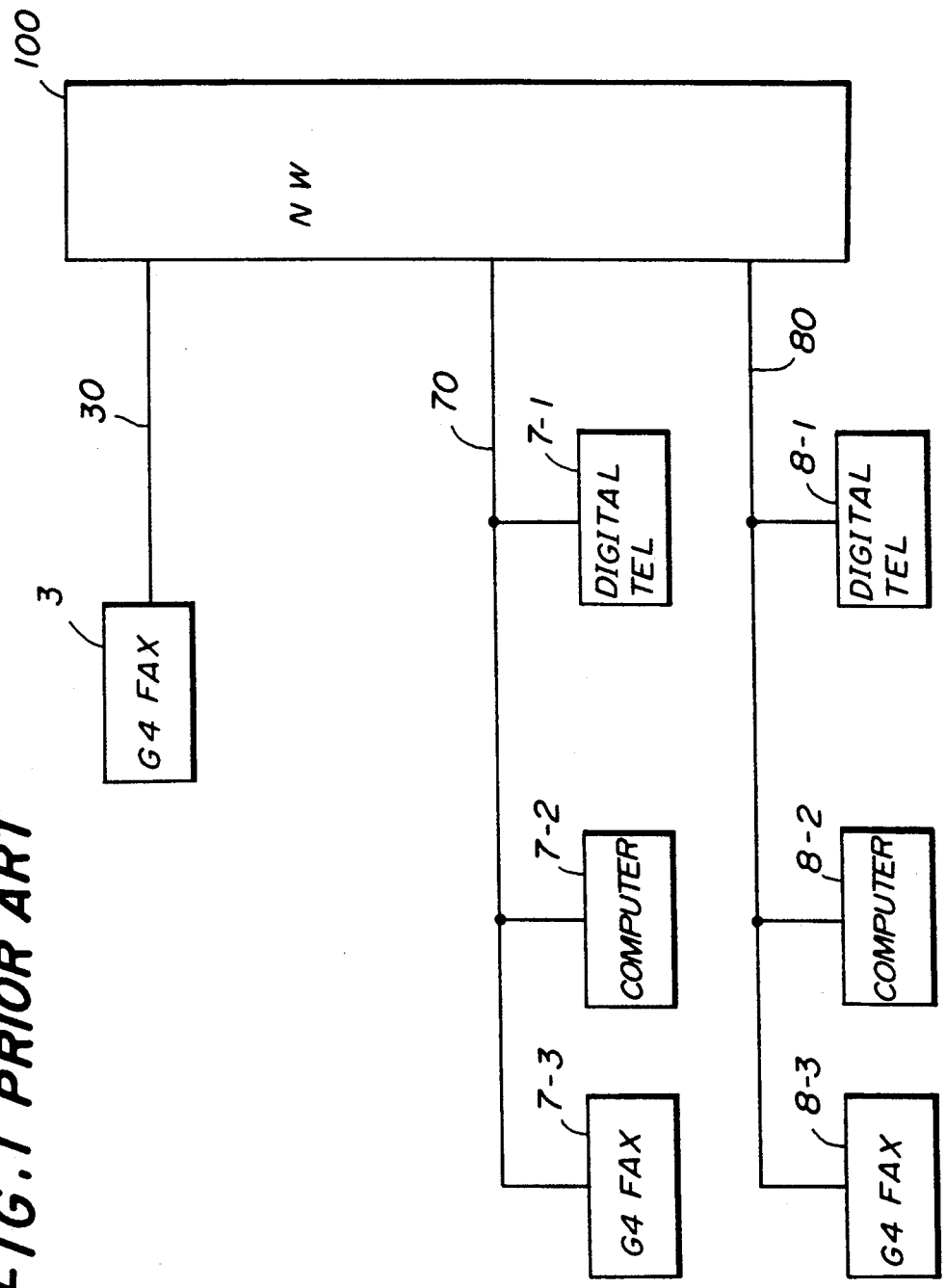
FIG. 1 is a block diagram of a conventional network system which accommodates a plurality of different attributes of terminal equipment devices.
Figure 3:
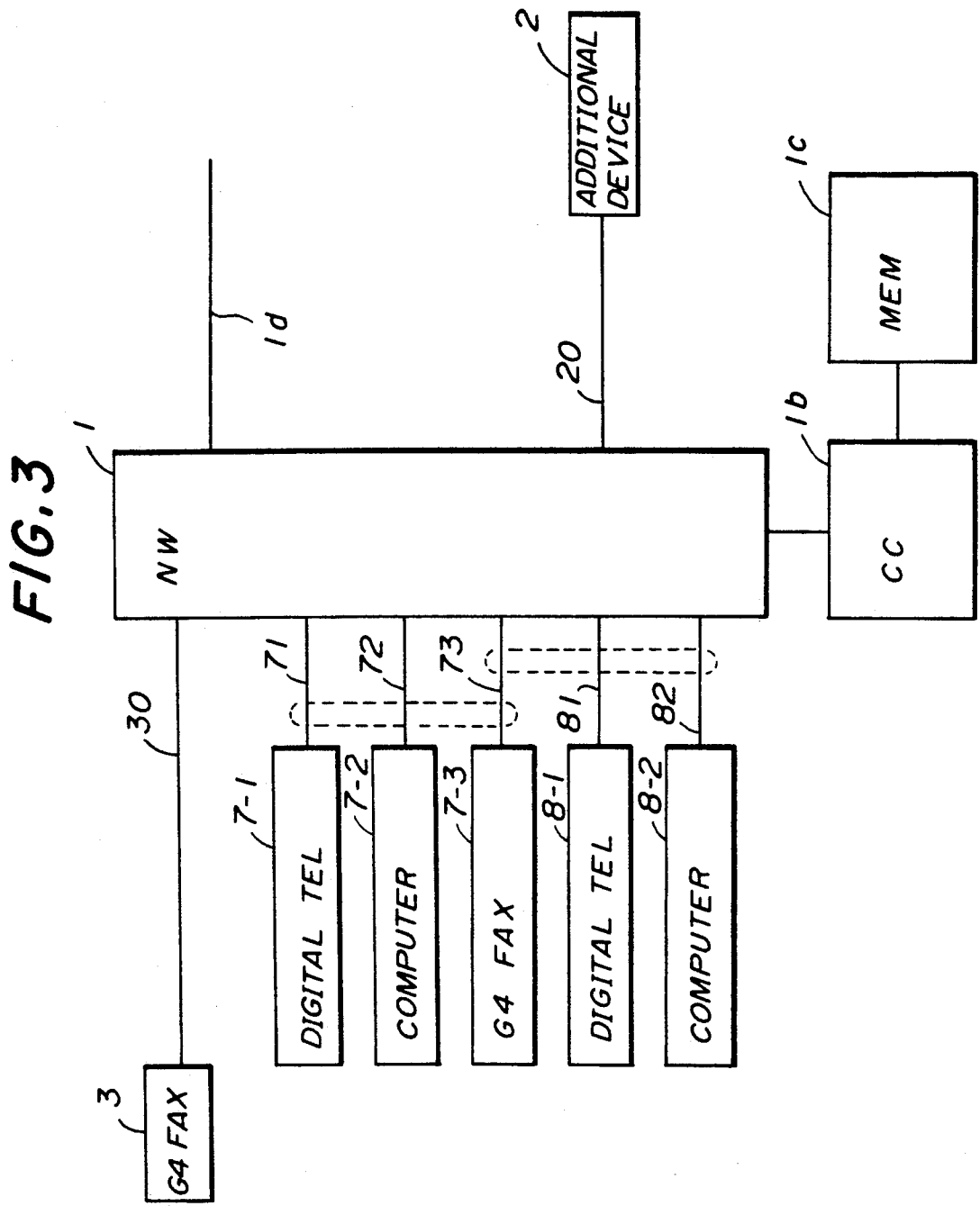
FIG. 3 is a block diagram of a detailed structure of the first preferred embodiment of the present invention.
Figure 4:
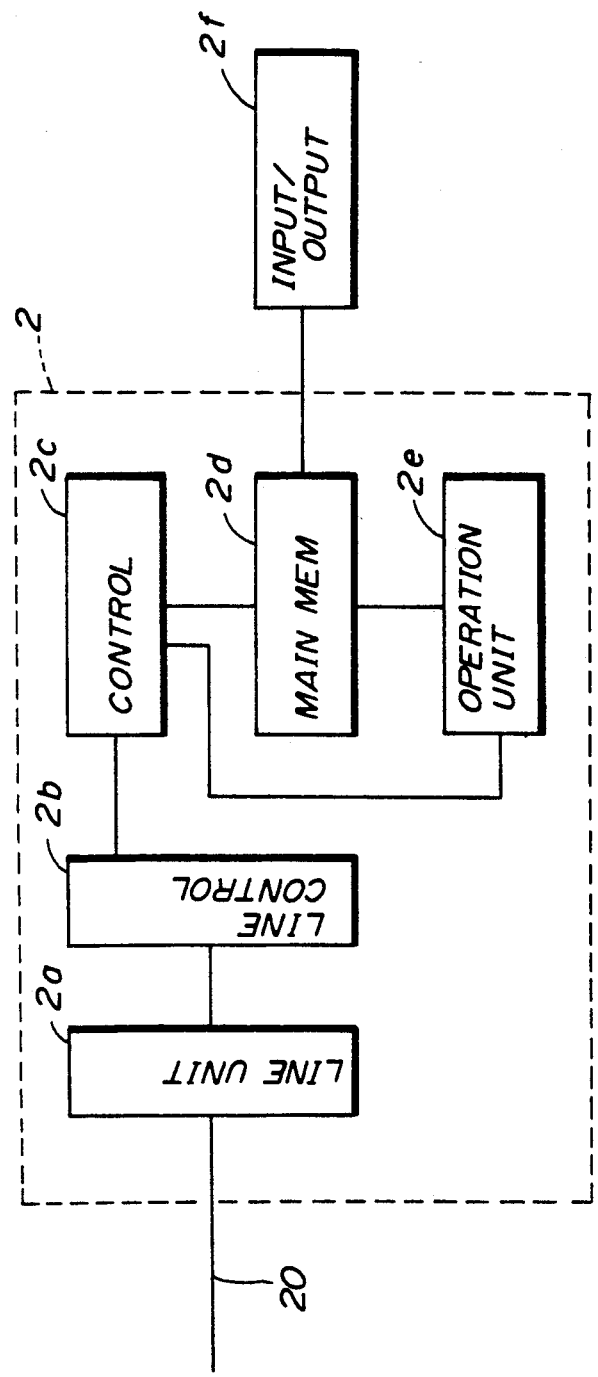
FIG. 4 is a block diagram of a device shown in FIG. 3.

FIG. 4 is a block diagram of the device 2 shown in FIG. 3. Referring to FIG. 4, the device 2 is composed of a line unit 2a, a line controller 2b, a controller 2c, a main memory 2d and an operation unit 2e. An input/output device 2f is connected to the main memory 2d of the additional device 2. The line unit 2a accommodates the extension line 20. The line controller 2b controls the connection between the network 1a and the device 2. The controller 2c controls the overall operation of the device 2. The main memory 2d stores a data table, which will be described in detail later. The operation unit 2e executes various operations. The input/output device 2f inputs data to the main memory 2d and reads out data therefrom.

FIG. 5 illustrates a part of the data table formed in the main memory 2d shown in FIG. 4. The data table is divided into three columns. The left-hand column of the data table relates to a pilot (representative) terminal of each group, a pilot address of the pilot terminal and an attribute thereof. The middle column relates to the name (type) of each terminal which forms a group together with the corresponding pilot terminal, and an address (alerting number) of each terminal. The right-hand column relates to the attribute of each terminal which forms a group together with the corresponding pilot terminal. In the illustrated case, the digital telephone set 7-1 is a pilot telephone, the attribute thereof is "0001", and the pilot address of the first group including the pilot digital telephone set 7-1 (that is, the address of the digital telephone set 7-1) is "701". Also as in FIG. 5, the digital telephone set 8-1 is a pilot address of the second group including the pilot digital telephone set 8-1. The attribute of the digital telephone set 8-1 is "0001", and the pilot address of the second group including the pilot digital telephone set 8-1 (that is, the address of the digital telephone set 8-1) is "801".

The first group having the digital telephone set 7-1 includes the personal computer 7-2 having an address of "702" and the G4 facsimile machine 7-3 having an address of "703". The attribute of the personal computer 7-2 is represented by "0002", and the attribute of each G4 facsimile machine 7-3 is represented by "0003", as shown in FIG. 5. Similarly, the second group having the digital telephone set 8-1 includes the personal computer 8-2 having an address of "802" and the G4 facsimile machine 7-3 having an address of "703".

The operation of the network system shown in FIG. 3 will be described by referring to FIGS. 6, 7A, 7B and 8. The operation described below relates to a case where the G4 facsimile machine 3 sends pilot address "701" to the network 1a so that facsimile data is transferred to a destination terminal. FIG. 6 illustrates a dialing sequence. At step (1) in FIG. 6, the digital telephone set 3 shown in FIG. 3 sends a call setup message, pilot address "701", address of the calling (source) terminal and attribute of the calling terminal 3, "0003", to the network 1a through the D channel on the extension line 30. At step (2), the network controller 1b receives the above information from the calling terminal 3 through the network 1a and sends back a call proceeding message to the calling terminal 3. Further, the network controller 1b analyzes pilot address "701" by referring to the memory 1c, which stores attribute information about each pilot address. As will be described later, this process may be omitted. The network controller 1b determines that the called terminal addressed by pilot address "701" is a digital telephone set. At step (3), the network controller 1b determines whether the attribute of the calling terminal 3 matches that of the called terminal 7-1. In this case, the determination result is negative.

At step (4), the network controller 1b sends a call setup message, attribute number "0003" of the calling terminal 3 and address "701" of the called terminal 7-1 to the device 2 through the D channel on the extension line 20. Further, the network controller 1b sends to the device 2 specific calling number "0000" which causes the device 2 recognize that the present call is supplied from the network controller 1b. At step (5), the device 2 receives the above information, and sends back an alerting message to the network controller 1b through the extension line 20 and the network 1a. When the device 2 is called by the network controller 1b, the device 2 executes the following process.

First, the controller 2c (FIG. 4) of the device 2 refers to pilot address "701" and accesses a corresponding row area of the data table formed in the main memory 2d. Second, under the control of the controller 2c, the operation unit 2e determines whether each of the terminals which form the first group together with the digital telephone set 7-1 has the same attribute as the calling terminal 3. In this case, the personal computer 7-2 and the G4 facsimile machine 7-3 belong to the same group as the digital telephone set 7-1, and the G4 facsimile machine 7-3 has the same attribute ("0003") as the G4 facsimile machine 3. Third, the controller 2c reads out the address of the terminal having the same attribute, that is, the G4 facsimile machine 7-3 from the data table. In this case, address "703" is read out from the main memory 2d.

At step (6), the device 2 sends a connect message and address "703" from the main memory 2d to the network controller 1b through the extension line 20 and the network 1a. At step (7), the network controller 1b receives the above information and sends an acknowledge message to the device 2, which is then disconnected from the network 1a.

Figure 7A:
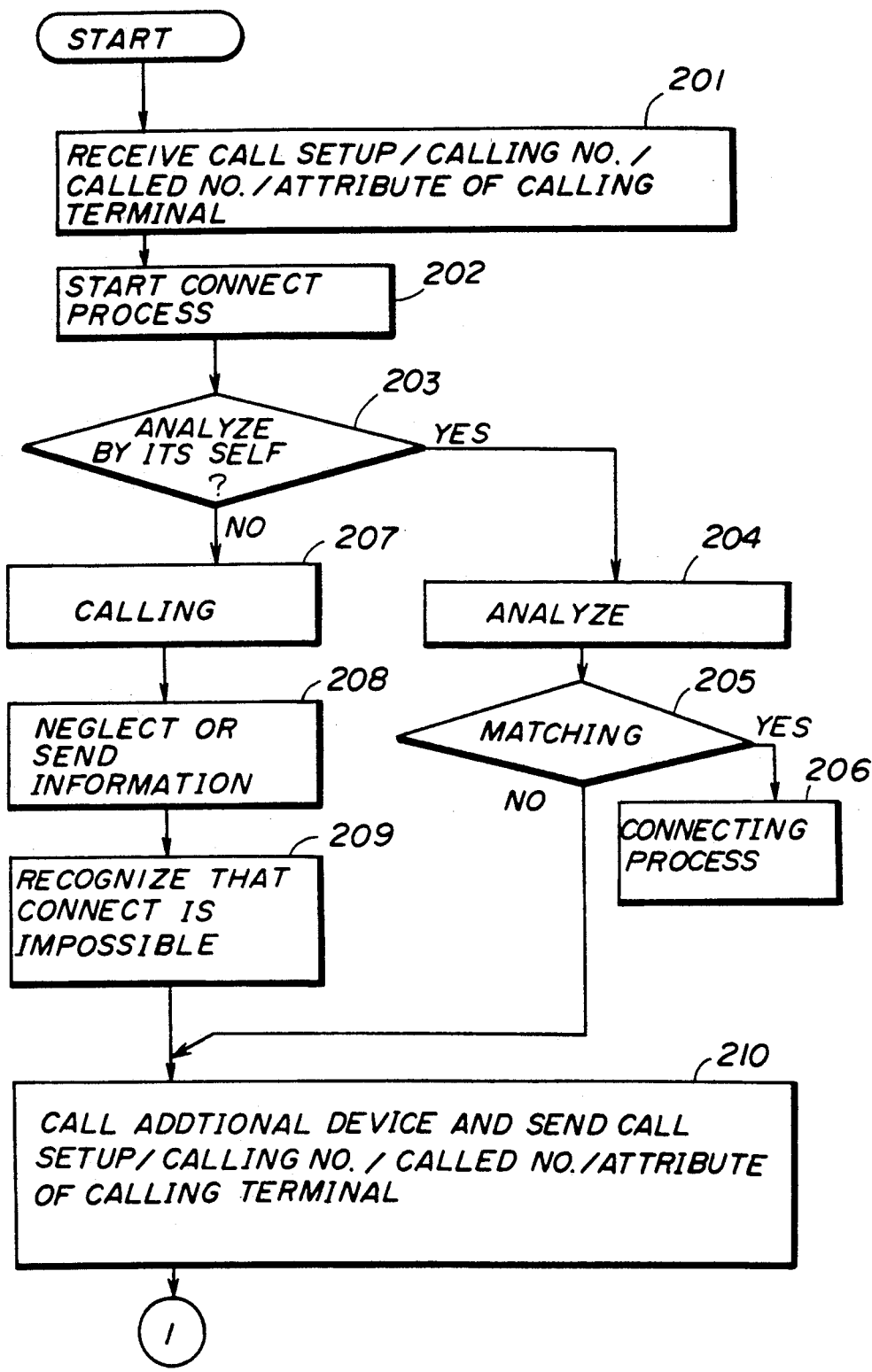
FIGS. 7A and 7B are flowcharts of the operation of a network controller and the device.
Figure 7B:
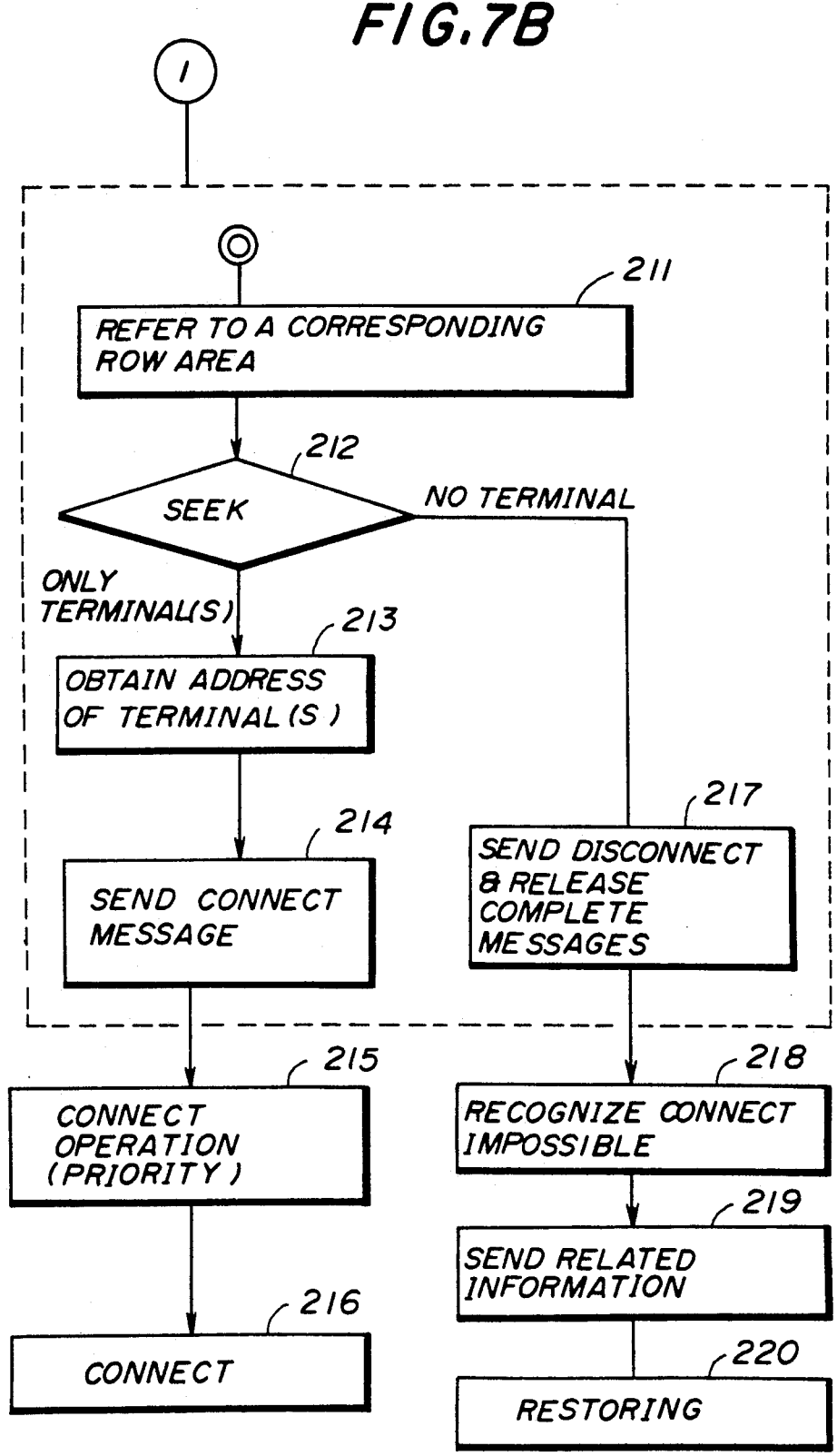

FIGS. 7A and 7B are flowcharts of a control operation which realize the sequence shown in FIG. 6. At step 201 in FIG. 7A, the network controller 1b receives the call setup message, the address of the source (calling) terminal, the address of the destination (called) terminal (pilot address) and the attribute information (number) of the source terminal from the source terminal. At step 202, the network controller 1b receives the above information and starts the dialing sequence shown in FIG. 6. At step 203, the network controller 1b determines whether it is required to analyze the called address from the source terminal and determine the attribute of the called terminal by itself from the analyzed result. For example, the network controller 1b could refer to a predetermined flag area provided in the system memory 1c and determine whether a "1" has been written into the corresponding flag area. When a "1" has been written into the corresponding flag area, the network controller 1b would then determine that the attribute of the called terminal should be analyzed and determined by itself from the address of the called terminal. At step 204, the network controller 1b analyzes the attribute of the called terminal by analyzing the address of the called terminal. As described previously, attribute information about each pilot terminal has been registered in the system memory 1c. At step 205, the network controller 1b determines whether the attribute of the called terminal coincides with that of the source terminal. When it is determined that the attribute of the called terminal coincides with that of the source terminal, the control operation proceeds to step 206, at which a conventional connecting process is carried out. Otherwise, the control proceeds to step 210.

Alternatively, it is possible to execute a procedure of steps 207-209, instead of the above-mentioned procedure of steps 204-206. That is, the control proceeds to step 207 when it is determined that the network controller 1b is not required to analyze the address of the destination terminal and determine the attribute of the destination terminal from the analyzed result. At step 207, the network controller 1b calls the destination terminal on the basis of the destination address and sends the attribute data of the source terminal. At step 208, the destination terminal receives the attribute data of the source terminal and determines whether its own attribute coincides with the attribute of the source terminal. When both the attributes coincide with each other, the destination terminal sends back an acknowledge message to the network controller 1b. On the other hand, when the attributes of the source and destination terminals do not coincide with each other, the destination terminal ignores the call from the source terminal. Alternatively, at step 208, the destination terminal sends back to the network controller 1b information indicating that the attributes of the source and destination terminals do not coincide with each other. This information may be a release complete message in the ISDN user/network interface, for example. At step 209, the network controller 1b recognizes that it is impossible to connect the source and destination terminals when no response is sent back from the destination terminal or when the release complete message is sent back therefrom.

At step 210, the network controller 1b calls the device 2 through the D channel on the extension line 20 and requests to seek all terminals which have the same attributes as the source terminal. At this time, the network controller 1b sends the device 2 the call setup message, the calling (source) address, the called (destination) address which is the pilot address, and the attribute data (number) of the source terminal. The call setup message has a user/user information element area in which information indicating that the present call setup message is supplied from the network controller 1b is placed.

Upon receiving the above information from the network controller 1b, at step 211, the controller 2c of the device 2 (FIG. 4) instructs the main memory 2d to output data stored in the row area of the data table corresponding to the pilot address to the operation unit 2e. Further, the controller 2c sends the attribute data of the source terminal to the operation unit 2e. At step 212, the operation unit 2e determines whether there is any terminal which has the same attribute as the source terminal. When it is determined that there is no such terminal, control proceeds to step 217 at which the controller 2c sends back a disconnect message and a release complete message to the network controller 1b through the D channel on the extension line 20. At step 218, the network controller 1b receives the disconnect message and the release complete message from the device 2, and is notified that no terminal having the same attribute as the source terminal is registered in the row area corresponding to the pilot address sent from the source terminal. At step 219, the network controller 1b sends, through the D channel on the extension line connected to the source terminal, the source terminal information representing that it is impossible for the source terminal to be connected to any terminals relating to the pilot address from the source terminal. For example, such information may be a busy tone signal for telephone sets, or the release message for terminals in conformity to the ISDN user/network interface. At step 220, a conventional restoring process is carried out.

On the other hand, at step 212, when the operation unit 2e (FIG. 4) finds one or more terminals which have the same attribute as the source terminal, the control proceeds to step 213. The controller 2c obtains the address of each destination terminal having the same attribute. At step 214, the controller 2c sends, through the D channel on the extension line 20, the network controller 1b a connect message in which there are provided the address of each destination terminal and the address of the source terminal. The connect message has a user/user information element area in which the above address information is placed. At step 215, the network controller 1b receives the connect message from the device 2, and starts a connect process. When one terminal having the same attribute as the source terminal is found at step 211, the network controller 1b connects this terminal and the source terminal. When two or more terminals each having the same attribute as the source terminal are found at step 211, the network controller 1b connects the source terminal to these terminals one by one in accordance with a predetermined priority control, which is stored in the system memory 1c (FIG. 3). The priority control defines priority on each terminal connected to the network 1a. Then, a conventional connect process is carried out at step 216.

FIG. 8 illustrates an alerting/connect sequence and a disconnect/release sequence. The alerting/connect sequence follows the dialing sequence shown in FIG. 6. Referring to FIG. 8, at step (8), the network controller 1b sends, through the D channel on the extension line 73, a call setup message, attribute number "0003" of the source terminal and address "703" thereof to the G4 facsimile machine 7-3. At step (9), in response to the call setup message from the network controller 1b, the G4 facsimile machine 7-3 returns an alerting message and a connect message to the network controller 1b. At step (10), the network controller 1b receives the alerting message and the connect message, and sends a connect acknowledge message to the G4 facsimile machine 7-3. On the other hand, the network controller 1b sends the connect message to the G4 facsimile machine 3 which is the source (calling) terminal. Thereby, a communication path (B channel) between the extension lines 30 and 73 is established so that the G4 facsimile machines 3 and 7-3 are permitted to communicate with each other.

When facsimile communication between the G4 facsimile machines 3 and 7-3 is completed, at step (11), the G4 facsimile machine 3 sends a disconnect message to the network controller 1b through the D channel on the extension line 30. The network controller 1b releases the communication path between the G4 facsimile machines 3 and 7-3, and sends a release message to the G4 facsimile machine 3. Further, the controller 1b sends a disconnect message to the G4 facsimile machine 7-3. At step (12), the G4 facsimile machine 3 sends the network controller 1b a release complete message, and the G4 facsimile machine 7-3 sends a release message to the network controller 1b. Then the network controller 1b sends the release complete message to the G4 facsimile machine 7-3.

The data table formed in the main memory 2d of the device 2 can be accessed by the digital telephone set 3, 7-1 or 8-1, and the input/output device 2f (FIG. 4). By way of example, a description will be given of a procedure in which the digital telephone set 7-1 calls the additional device 2 and accesses the data table with reference to FIG. 9.

At step (1) in FIG. 9, the digital telephone set 7-1 sends the call setup message, address (telephone number) "200" of the device 2 and its own address "701" to the network controller 1b through the D channel on the extension line 71. At step (2), upon receiving the above information, the network controller 1b returns a call processing message to the digital telephone set 7-1. The network controller 1b analyzes the received address "200" and recognizes that the destination terminal is the device 2. Then the sequence proceeds to the alerting/connect sequence.

At step (3), the network controller 1b sends the call setup message and address "701" of the source terminal to the device 2 through the D channel on the extension line 20 so that the device 2 is called. At step (4), the device 2 receives the above information and then returns a connect acknowledge message to the network controller 1b. Further, at step (4), the additional controller 2 recognizes that this call is from a terminal, and then sends the connect message to the network controller 1b. At step (5), the network controller 1b receives these messages from the device 2 and sends back the connect acknowledge message to the digital telephone set 7-1. Further, the network controller 1b establishes a communication path between the extension lines 71 and 20 so that the digital telephone set 7-1 and the additional controller 2 are permitted to communicate with each other.

During communication, at step (6), the digital telephone set 7-1 receives the connect message from the network controller 1b, and then sends "**", "the address of each terminal which belongs to the terminal identified by the pilot address", "*", "the attribute number of the each above terminals" and "**" to the device 2 in this order. It will be noted that "*" or "" is identification information which separates information from other information. In the case shown in FIG. 5, a sequence of data, 702*0002****703*0003, is sent from the digital telephone set 7-1. At step (7), the device 2 receives this information and writes pilot address "703" in the data table formed in the main memory 2d.

Then, the disconnect/release process is carried out. At step (8), when the digital telephone set 7-1 completes transmission of the aforementioned information, it sends the disconnect message to the network controller 1b through the D channel on the extension line 71. The network controller 1b receives this message and releases the communication path between the digital telephone set 7-1 and the device 2. Then the network controller 1b sends the disconnect message to the device 2, which, at step (9), sends back the release message to the network controller 1b. On the other hand, the digital telephone set 7-1 sends the network controller 1b the release complete message. Then the network controller 1b sends the release complete message to the device 2.

Similarly, the digital telephone set 3 or 8-1 can write data into the data table formed in the main memory 2d. It is also possible to write data into the main memory 2d through the input/output device 2f.

Figure 10:
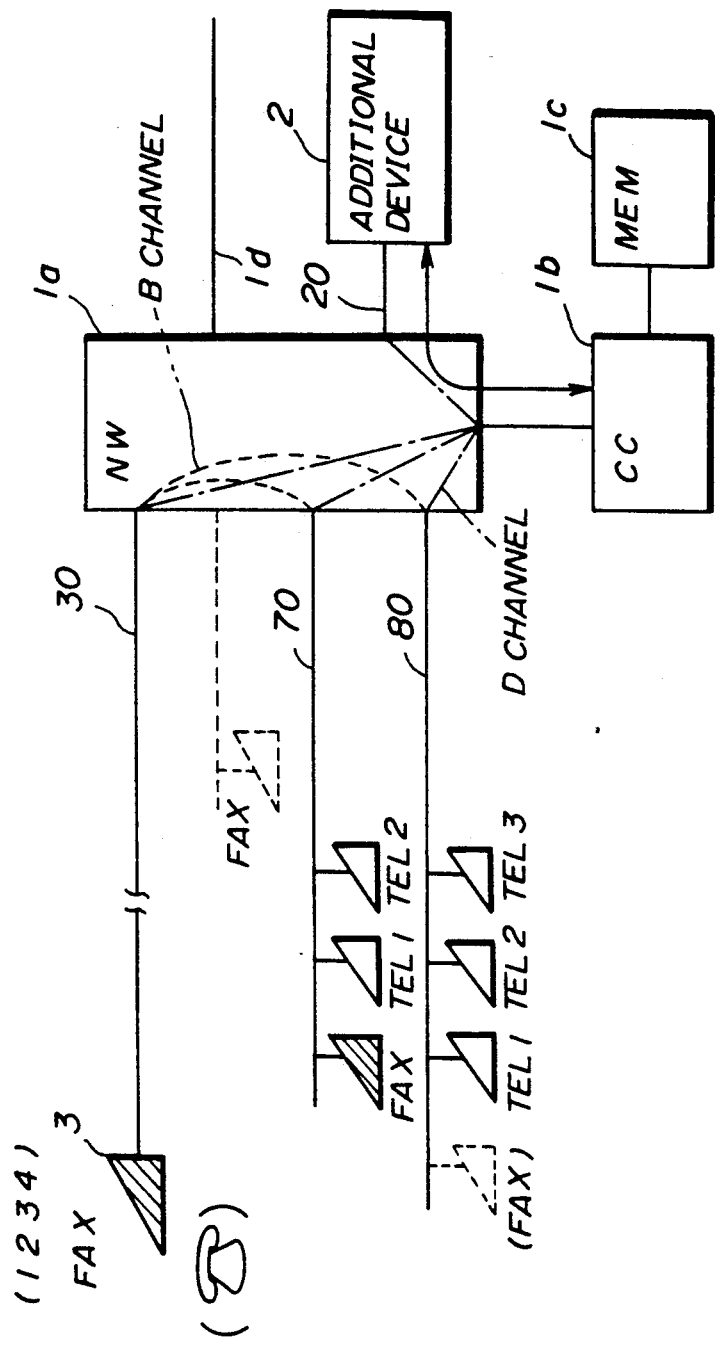
FIG. 10 is a block diagram of a second preferred embodiment of the present invention.
Figure 1:
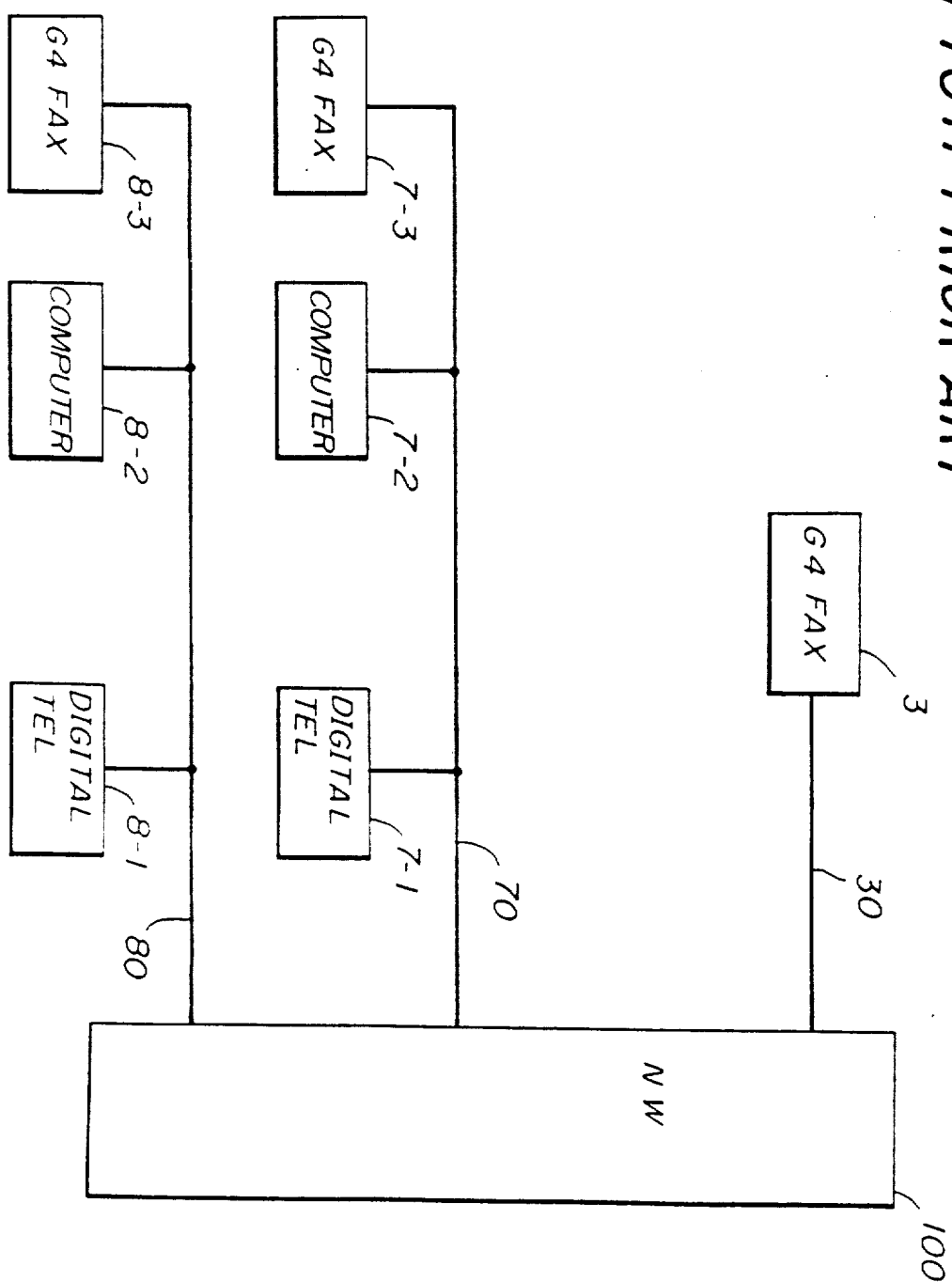

A description will now be given of a second preferred embodiment of the present invention with reference to FIG. 10, which is a block diagram of a network system according to the second preferred embodiment of the present invention. A plurality of terminals are connected to each extension line. A facsimile machine FAX, and two telephone sets TEL1 and TEL2 are connected to an extension line 70. Three telephone sets TEL1, TEL2 and TEL3 are connected to an extension line 80.

FIG. 11 shows a data table formed in the main memory 2d (FIG. 4) of the device 2. The data table stores line addresses and attribute information. The extension line 70 has a line address of "701" and the extension line 80 has a line address of "801". Line address "701" is the address of the telephone set TEL1 connected to the extension line 70 and is a pilot address which represents the telephone set TEL2 having address "702" and the facsimile machine FAX having address "703". Line address "801" is the address of the telephone set TEL1 connected to the extension line 80 and is a pilot address which represents the telephone set TEL2 having address "802" and the telephone set TEL3 having address "803". It will be noted that the facsimile machine 7-1 connected to the extension line 70 can be accessed by the line address "701" or the line address "801". The network system shown in FIG. 10 operates in the same manner as that according to the aforementioned first embodiment of the present invention.

The present invention is not limited to the specifically described embodiments. The present invention includes an analog switching system in which the network 1a shown in FIG. 3 is a line exchanger. It is possible to incorporate the function of the device 2 in the network controller 1b. In this alternative, the data table formed in the main memory (FIG. 4) is registered in the system memory 1c.

It is further possible to provide the network controller 1b of the following first and second functions. The first function is to determine, when an incoming call having a telephone number designating one of the plurality of groups is supplied to the network, whether or not an attribute of the incoming call coincides with an attribute of each terminal included in the one of the plurality of groups. The second function is to determine whether or not there is any terminal which is included in the plurality of groups other than the one of the plurality of groups which has an attribute identical to that of the incoming call when it is determined that there is no terminal in the one of the plurality of groups. The second function also terminates the call at the terminal which is included in the plurality of groups other than the one of the plurality of groups which has an attribute identical to that of the incoming call when it is determined that there is no terminal in the one of the plurality of groups. It is further possible to provide the network controller 1b with only the above-mentioned first function and provide the device 2 with the second function.

The present invention is not limited to the specifically described embodiments, and variations and modifications may be made without departing from the scope of the present invention.

What is claimed is:

1. A network system, comprising:
a plurality of terminals, including a source terminal and a destination terminal, classified into a plurality of groups, each of the groups including terminals having the same attribute, and each of the plurality of terminals having a plurality of attributes and belonging to a plurality of groups;
network means for selectively connecting said plurality of terminals to each other; and
control means, operatively coupled to said network means, for receiving a call indicating one of said groups from said source terminal which is one of said plurality of terminals and for coupling, through said network means, said source terminal to said destination terminal which is one terminal included in said one of the groups, said destination terminal and said source terminal having identical attributes.

2. A network system as claimed in claim 1, wherein each of said plurality of terminals has an address, and wherein said control means comprises:
memory means for storing information about an attribute of each terminal and the address thereof in each of said plurality of groups;
seeking means for seeking said destination terminal which is included in said one of the groups and which has the attribute identical to that of said source terminal, and for outputting the address of said destination terminal; and
coupling means for receiving the address of said destination terminal from said seeking means and coupling said source terminal to said destination terminal corresponding to the address.

3. A network system as claimed in claim 2, wherein each of said plurality of groups is assigned a pilot address, and wherein said memory means stores both said information about the attribute of each terminal and the address thereof for said pilot address assigned to each of said plurality of groups.

4. A network system as claimed in claim 3, wherein said pilot address assigned to each of said plurality of groups is an address of one of the terminals included in a corresponding one of said plurality of groups.

5. A network system as claimed in claim 4, further comprising determining means for determining whether said one of the terminals corresponding to said pilot address has the same attribute as that of said source terminal and for requesting said seeking means to seek said destination terminal which is included in said one of the groups and has the attribute identical to that of said source terminal when said determining means determines that the attribute of said one of the terminals corresponding to said pilot address is different from that of said source terminal.

6. A network system as claimed in claim 1, wherein said network system has an extension line, further comprising a device which includes:
memory means for storing information about an attribute of each terminal and the address thereof in each of said plurality of groups; and
seeking means for seeking said destination terminal which is included in said one of the groups and which has the attribute identical to that of said source terminal, and for outputting the address of said destination terminal and which is coupled to said network means through the extension line.

7. A network system as claimed in claim 6, wherein said device comprises communication means for communicating with said control means through said network means.

8. A network system as claimed in claim 2, wherein said call from said source terminal includes information about the attribute of said source terminal and a pilot address of said one of the plurality of groups.

9. A network system as claimed in claim 2, wherein when said seeking means finds no terminal having the attribute identical to that of said source terminal, said coupling means ignores said call from said source terminal.

10. A network system as claimed in claim 2, wherein said control means includes means for generating information indicating that said one of the plurality of groups called by said source terminal has no terminal having the attribute identical to that of said source terminal when said seeking means finds no terminal having the attribute identical to that of said source terminal.

11. A network system, comprising:
a plurality of terminals, including a source terminal and
destination terminals, classified into a plurality of groups, each of the groups including terminals having the same attribute, and each of the plurality of terminals having a plurality of attributes and belonging to a plurality of groups;
network means for selectively connecting said plurality of terminals to each other; and
control means, operatively coupled to said network means, for receiving a call indicating one of said groups from the source terminal which is one of said plurality of terminals and for coupling, through said network means, said source terminal to all destination terminals, each of which is one terminal included in said one of the groups and which destination terminals have an attribute which is identical to that of said source terminal.

12. A network system as claimed in claim 11, wherein said control means connects said source terminal to said destination terminals one by one in accordance with a predetermined priority of said plurality of terminals.

13. A network system as claimed in claim 11, wherein:
each of said plurality of terminals has an address; and wherein said control means comprises:
memory means for storing information about an attribute of each terminal and the address thereof in each of said plurality of groups,
seeking means for seeking said destination terminals which are included in said one of the groups and have the attribute identical to that of said source terminal and for outputting the address of each of said destination terminals, and
coupling means for receiving the address of each of said destination terminals from said seeking means and coupling said source terminal to said destination terminals one by one in accordance with a predetermined priority of said plurality of terminals.

14. A network system for communicating with an external network through a line, comprising:
- a plurality of terminals classified into a plurality of groups;
- network means for connecting said plurality of terminals to each other, for connecting said plurality of terminals to the line from the external network, and for receiving an incoming call having a telephone number designating one of said plurality of groups;
- first determining means, operatively coupled to said network means, for determining, when the telephone number of the incoming call designates one of said plurality of groups, whether or not an attribute of said incoming call coincides with an attribute of any terminal included in said one of the plurality of groups; and
- second determining means, operatively coupled to said network means and said first determining means, for determining whether or not there is any terminal which is included in said plurality of groups other than said one of the plurality of groups which has an attribute identical to that of said incoming call when said first determining means determines that there is no terminal in said one of the plurality of groups, and for terminating said incoming call at the terminal which is included in said plurality of groups other than said one of the plurality of groups which has the attribute identical to that of said incoming call when said first determining means determines that there is no terminal in said one of the plurality of groups.

15. A network system as claimed in claim 14, further comprising a controller means, including said first determining means and said second determining means, for controlling said network means of said network system.

16. A network system as claimed in claim 14, further comprising a controller means, including said first determining means and said second determining means, for controlling said network means of said network system and being provided in an additional terminal coupled to said network.

17. A network system as claimed in claim 14, wherein said telephone number included in said call includes a pilot number which indicates a corresponding one of said plurality of groups.

18. A network system as claimed in claim 14, wherein each of said plurality of terminals is an integrated services digital network terminal, and said line is ISDN terminal lines, and wherein said telephone number is an address number which indicates a corresponding ISDN terminal line.

19. A network system as claimed in claim 18, wherein the attribute of said incoming call is received in the form of a message.

20. A method for connecting a calling terminal in a network system, comprising the steps of:
- determining whether a called terminal has a same attribute as the calling terminal;
- connecting the calling and called terminals if the calling and called terminals have the same attributes;
- referring to a table containing a plurality of groups if the calling and called terminals do not have the same attributes, each one of the groups having a plurality of terminal addresses and respective attributes of the terminals therein, at least one of the groups corresponding to the calling terminal;
- checking the at least one of the groups corresponding to the calling terminal to find each terminal which as the same attribute as the calling terminal; and
- connecting the calling terminal to one of the terminals in the at least one of the groups corresponding to the calling terminal based on said checking step.

21. A method for obtaining an address of at least one terminal, and for connecting a calling terminal and the at least one terminal, comprising the steps of:
- storing a plurality of addresses and attributes of a plurality of terminals which correspond to an identity of a calling terminal;
- receiving the identity of the calling terminal;
- determining whether the attribute of at least one terminal which corresponds to the identity of the calling terminal is identical to the attribute of the calling terminal; and
- outputting the address of the at least one terminal having that attribute identical to the calling terminal if such terminal is found in said determining step.

22. A method according to claim 21, wherein said storing step can be performed by the calling terminal which supplies data corresponding to the plurality of addresses and attributes.

23. A method for connecting an incoming call, comprising the steps of:
- determining, when the incoming call having a telephone number designating a first one of the plurality of groups is supplied, whether an attribute of the incoming call is identical to an attribute for any terminal included in the first one of the plurality of groups;
- providing connection between the calling terminal and a terminal having the attribute identical to the calling terminal if any such terminal is found in the first one of the plurality of groups;
- determining whether any terminal exists which is included in a second one of the plurality of groups, which terminal has the attribute identical to that of the incoming call if no terminal exists which has the attribute identical to that of the incoming call in the first one of the plurality of groups; and
- terminating the incoming call at the terminal included within the second one of the plurality of groups if such terminal is found.

24. A network system, comprising:
- a plurality of terminals, including a source terminal and a destination terminal, classified into a plurality of groups;
- network means for selectively connecting said plurality of terminals to each other; and
- control means, operatively coupled to said network means, for receiving a call indicating one of said groups from said source terminal which is one of said plurality of terminals and for coupling, through said network means, said source terminal to said destination terminal which is one terminal included in said one of the groups, said destination terminal and said source terminal having identical attributes, each of said plurality of terminals having an address, and said control means including:
- memory means for storing information about an attribute of each terminal and the address thereof in each of said plurality of groups;
- seeking means for seeking said destination terminal which is included in said one of the groups and which has the attribute identical to that of said source terminal, and for outputting the address of said destination terminal; and coupling means for receiving the address of said destination terminal from said seeking means and coupling said source terminal to said destination terminal corresponding to the address.

25. A network system as claimed in claim 24, wherein each of said plurality of groups is assigned a pilot address, and wherein said memory means stores said information about the attribute of each terminal and the address thereof for said pilot address assigned to each of said plurality of groups.

26. A network system as claimed in claim 25, wherein said pilot address assigned to each of said plurality of groups is an address of one of the terminals included in a corresponding one of said plurality of groups.

27. A network system as claimed in claim 26, further comprising determining means for determining whether said one of the terminals corresponding to said pilot address has the same attribute as that of said source terminal and for requesting said seeking means to seek said destination terminal which is included in said one of the groups and has the attribute identical to that of said source terminal when said determining means determines that the attribute of said one of the terminals corresponding to said pilot address is different from that of said source terminal.

28. A network system as claimed in claim 24, wherein said network system has an extension line, further comprising an additional device which includes said memory means and said seeking means and which is coupled to said network means through an extension line.

29. A network system as claimed in claim 28, wherein said device comprises communication means for communicating with said control means through said network means.

30. A network system as claimed in claim 24, wherein said call from said source terminal includes information about the attribute of said source terminal and a pilot address of said one of the plurality of groups.

31. A network system as claimed in claim 24, wherein when said seeking means finds no terminal having the attribute identical to that of said source terminal, said coupling means ignores said call from said source terminal.

32. A network system as claimed in claim 24, wherein said control means includes means for generating information indicating that said one of the plurality of groups called by said source terminal has no terminal having the attribute identical to that of said source terminal when said seeking means finds no terminal having the attribute identical to that of said source terminal.

* * * * *

UNITED STATES PATENT AND TRADEMARK OFFICE
CERTIFICATE OF CORRECTION

PATENT NO. : 5,276,687
DATED : JANUARY 4, 1994
INVENTOR(S) : Naoyuki MIYAMOTO

It is certified that error appears in the above-indentified patent and that said Letters Patent is hereby corrected as shown below:

Please REPLACE the drawings in the Letters Patent with the correct drawings attached hereto.

Col. 5, line 12, "NW9." should be --NWZ 9.--.

Col. 10, line 62, "the call" should be --the incoming call--.

Col. 13, line 44, "said call" should be --said incoming call--.

Signed and Sealed this

First Day of November, 1994

Attest:

BRUCE LEHMAN

Attesting Officer

Commissioner of Patents and Trademarks

FIG. 5

| | PILOT ADDRESS, NAME OF PILOT TERMINAL & ATTRIBUTE | NAME AND ADDRESS OF TERMINAL IN THE SAME GROUP AS PILOT TERMINAL | ATTRIBUTE OF EACH TERMINAL |
|---|---|---|---|
| WRITE CONTENTS | ADDRESS 701 DIGITAL TELEPHONE 0001 | COMPUTER 702 | 0002 |
| | | G4 FAX 703 | 0003 |
| | ADDRESS 801 DIGITAL TELEPHONE 0001 | COMPUTER 802 | 0002 |
| | | G4 FAX 703 | 0003 |
| | ---- | ---- | ---- |

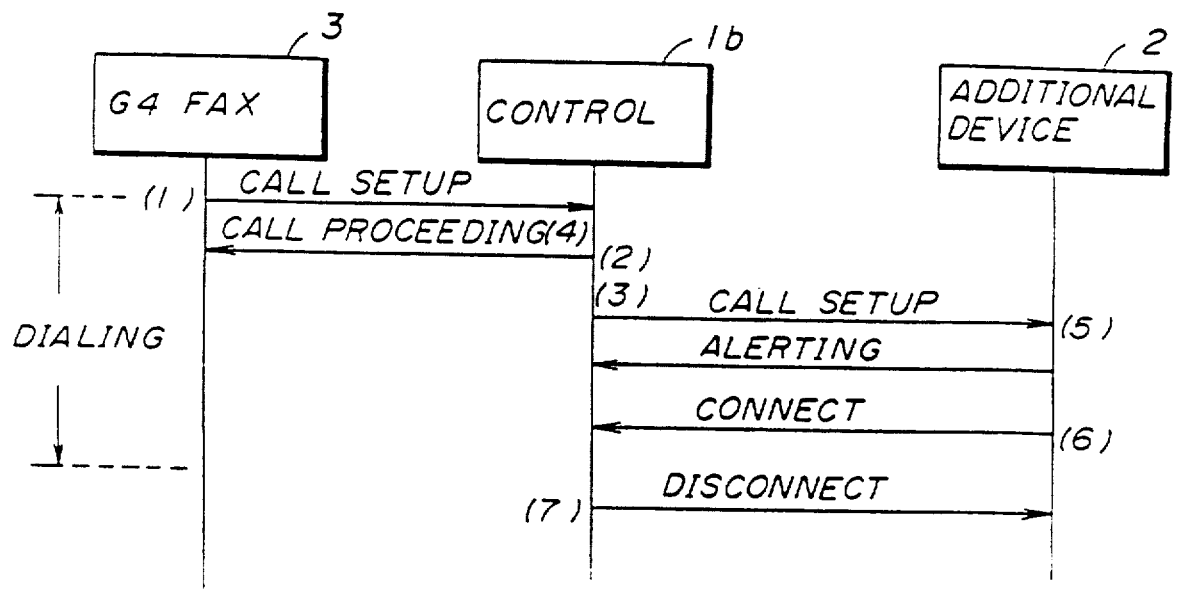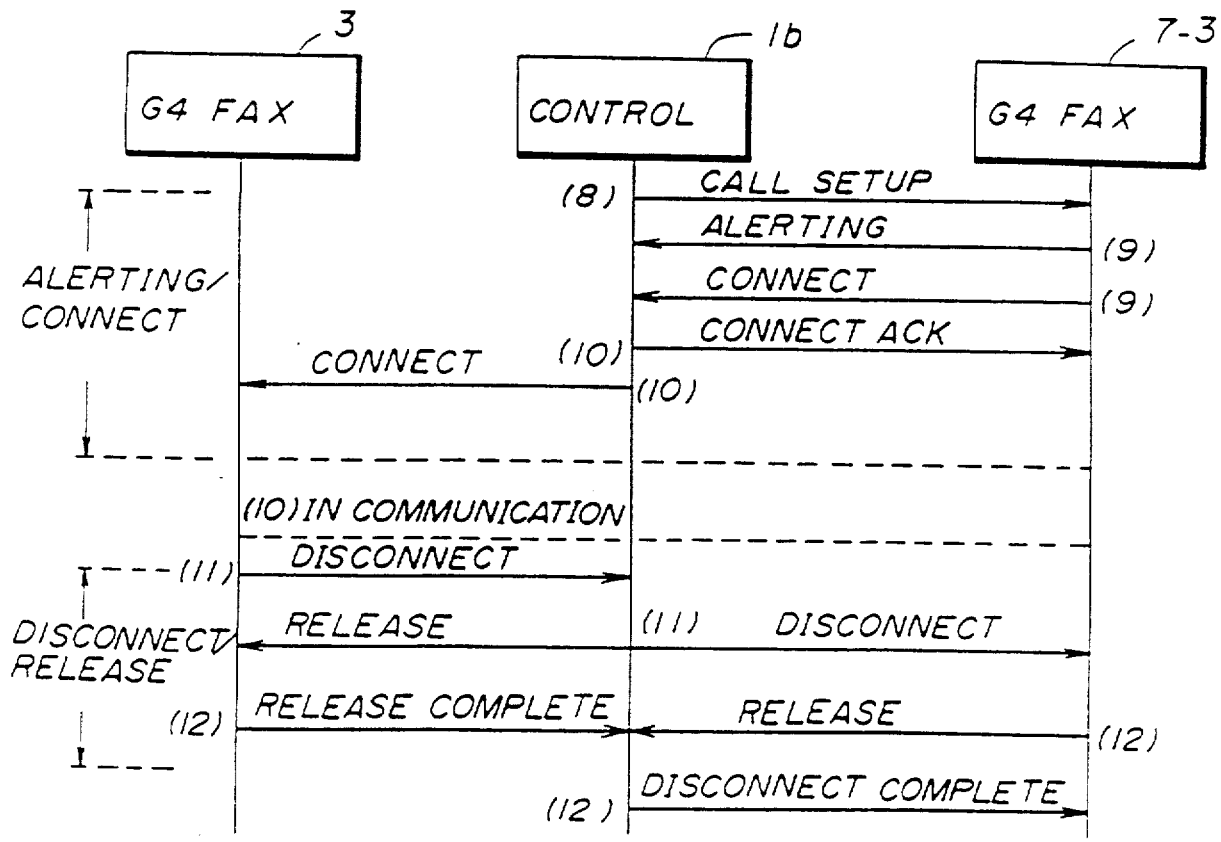

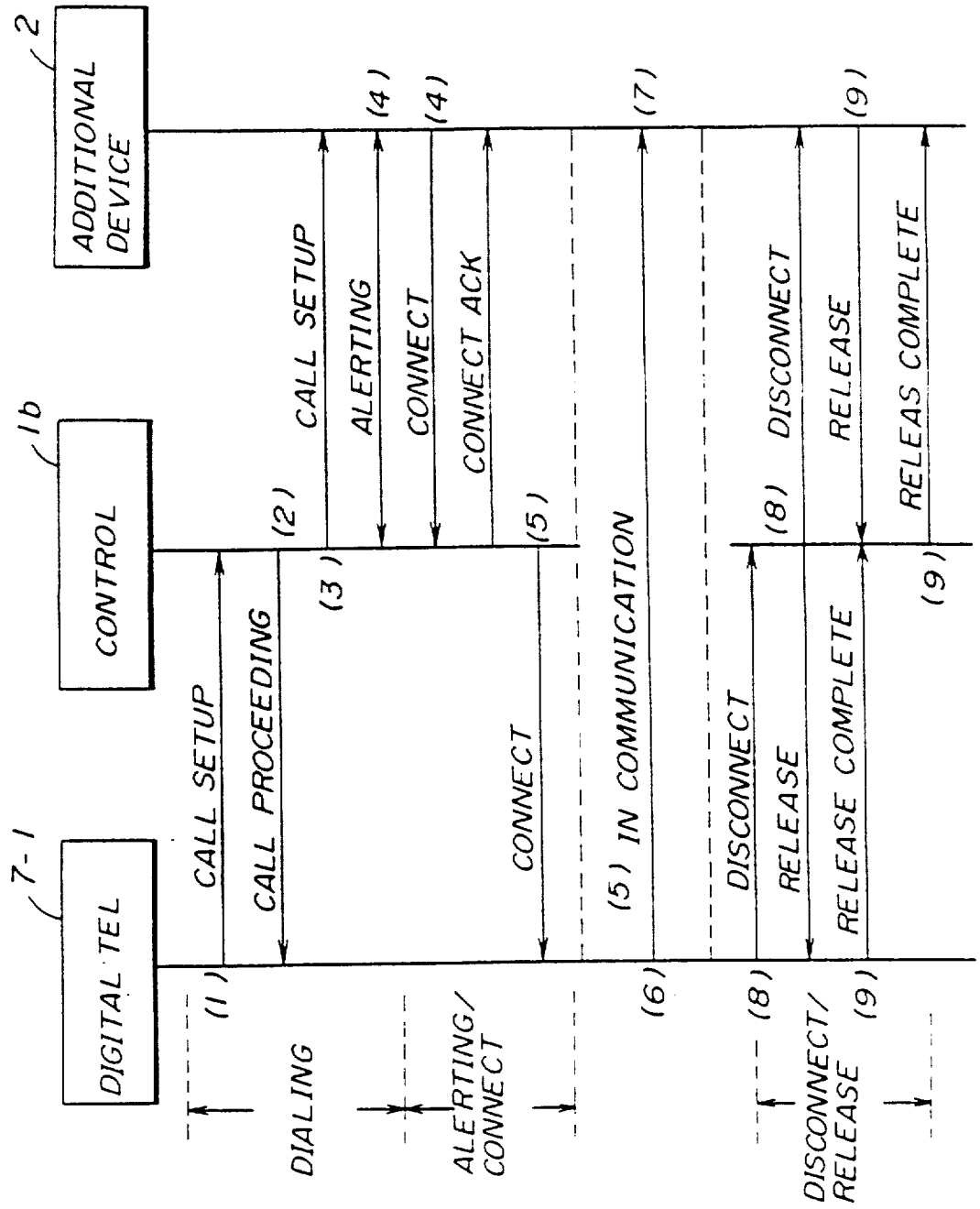

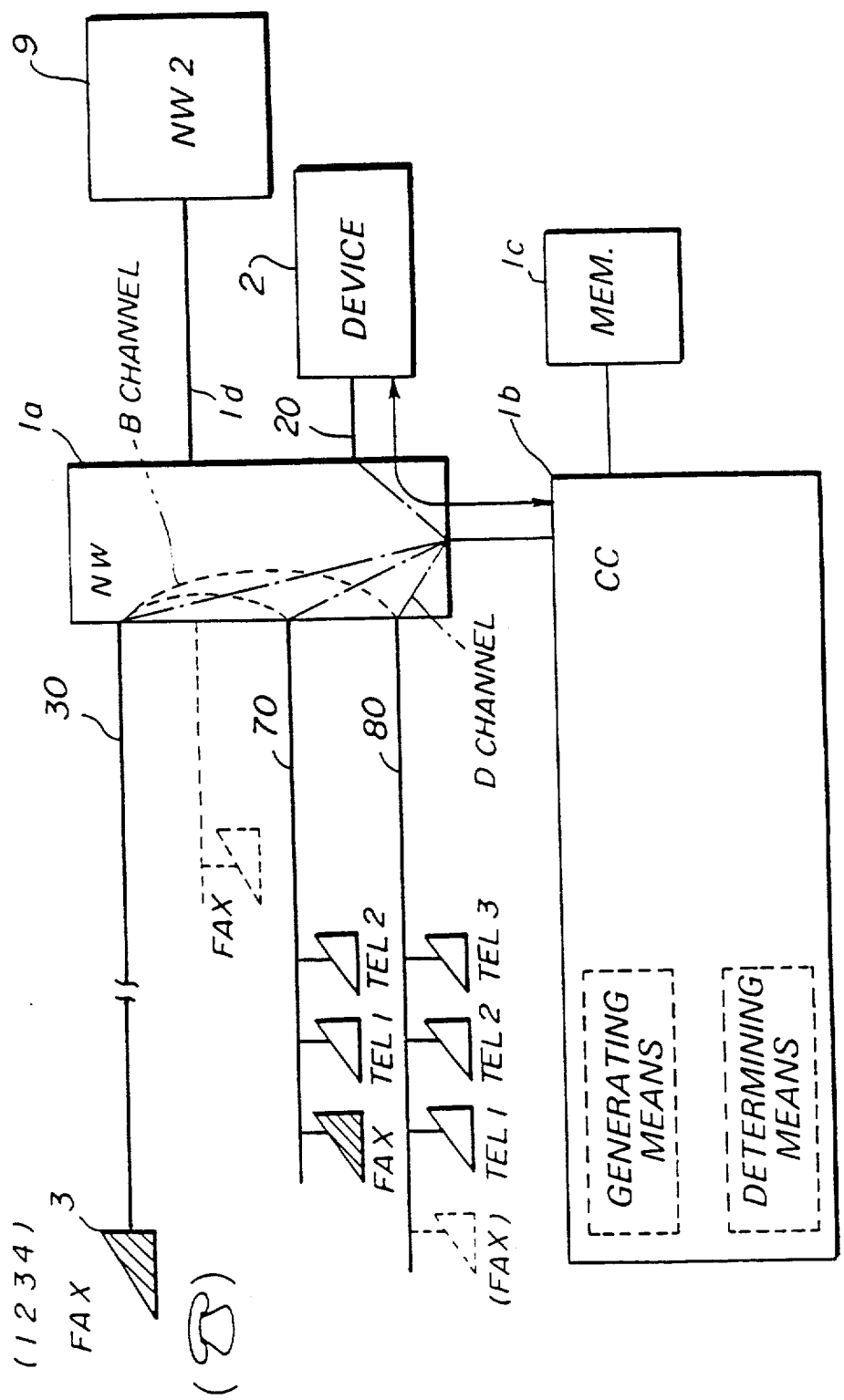

FIG.11

| LINE ADDRESS (PILOT TERMINAL) | ADDRESS OF EACH TERMINAL IN THE SAME GROUP AS PILOT TERMINAL | ATTRIBUTE OF EACH TERMINAL |
|---|---|---|
| 701 (TEL 1) | 702 | TEL 2 |
|  | 703 | FAX |
| 801 (TEL 1) | 802 | TEL 2 |
|  | 803 | TEL 3 |
|  | 703 | FAX |
|  | ---- | ---- |